(12) United States Patent
Malvoisin

(10) Patent No.: US 11,364,491 B2
(45) Date of Patent: Jun. 21, 2022

(54) DOG CLUTCH SYSTEM FOR HOLDING THE POSITION OF A VOLUME ADJUSTMENT SCREW FOR A SAMPLING PIPETTE

(71) Applicant: GILSON SAS, Villiers-Lebel (FR)

(72) Inventor: Hervé Malvoisin, Paris (FR)

(73) Assignee: GILSON SAS, Villiers-Lebel (FR)

( * ) Notice: Subject to any disclaimer, the term of this patent is extended or adjusted under 35 U.S.C. 154(b) by 116 days.

(21) Appl. No.: 17/046,944

(22) PCT Filed: Apr. 12, 2019

(86) PCT No.: PCT/FR2019/050876
§ 371 (c)(1),
(2) Date: Oct. 12, 2020

(87) PCT Pub. No.: WO2019/202245
PCT Pub. Date: Oct. 24, 2019

(65) Prior Publication Data
US 2021/0146349 A1   May 20, 2021

(30) Foreign Application Priority Data

Apr. 17, 2018 (FR) ...................... 1853369

(51) Int. Cl.
*B01L 3/02* (2006.01)
*G01F 11/02* (2006.01)

(52) U.S. Cl.
CPC .......... *B01L 3/0224* (2013.01); *B01L 3/0241* (2013.01)

(58) Field of Classification Search
CPC .................................................... B01L 3/0224
See application file for complete search history.

(56) References Cited

U.S. PATENT DOCUMENTS

| 5,892,161 A | 4/1999 | Conley et al. |
| 2018/0250667 A1 | 9/2018 | Dudek et al. |

FOREIGN PATENT DOCUMENTS

| CN | 20158707 U | 8/2010 |
| CN | 202113872 U | 1/2012 |
| CN | 107351076 A | 11/2017 |
| CN | 107866287 A | 4/2018 |
| EP | 2803411 A1 | 11/2014 |
| FR | 3040896 A1 | 3/2017 |

OTHER PUBLICATIONS

International Search Report and translation for PCT/FR2019/050876 dated Aug. 19, 2019.

(Continued)

*Primary Examiner* — Christopher Adam Hixson
(74) *Attorney, Agent, or Firm* — Pearne & Gordon LLP

(57) ABSTRACT

A dog clutch system for holding the position of a volume adjustment screw for a pipetting system, the system comprising: —a first toothed wheel comprising first teeth; —a second toothed wheel comprising second teeth; —a return spring capable of urging the first and second wheels against each other, the second teeth of the second wheel forming a number N of concentric annular rows, and the second wheel having at least one tooth overlap area in which the N annular rows of second teeth have, respectively, N overlap sectors that overlap each other in a radial direction, and within which the teeth are angularly offset.

10 Claims, 7 Drawing Sheets

(56) References Cited

OTHER PUBLICATIONS

Written Opinion for PCT/FR2019/050876 dated Aug. 19, 2019.
Search Report for French application No. FR 1853369 dated Dec. 19, 2018.
Specification and drawings for U.S. Appl. No. 17/047,100 entitled "Device for Locking a Volume Adjustment Screw for a Pipetting System" filed Oct. 13, 2020.
Specification and drawings for U.S. Appl. No. 17/052,324 entitled "System for Ejecting Tips of Sampling Pipettes With Improved Ergonomics" filed Nov. 2, 2020.
Search Repost for CN2019800055221 dated Oct. 26, 2021 and translation thereof.
Office action for CN2019800055221 dated Nov. 1, 2021 and translation thereof.

DOG CLUTCH SYSTEM FOR HOLDING THE POSITION OF A VOLUME ADJUSTMENT SCREW FOR A SAMPLING PIPETTE

CROSS-REFERENCE TO RELATED APPLICATIONS

This is a National Stage application of PCT international application PCT/FR2019/050876, filed on Apr. 12, 2019, which claims the priority of French Patent Application No. 1853369, filed Apr. 17, 2018, both of which are incorporated herein by reference in their entirety.

TECHNICAL FIELD

The present invention relates to the field of pipetting systems such as automated pipetting systems called robots, or even more preferentially monochannel or multichannel collection pipettes, also called laboratory pipettes, or even air displacement liquid transfer pipettes, for the calibrated liquid collection and introduction into containers. Such pipettes, whether manual, motorised or hybrid, are to be held by hand by an operator during liquid collection and dispense operations.

The invention more particularly relates to means implemented to adjust the liquid volume to be collected.

STATE OF PRIOR ART

On conventional pipettes, a screw for adjusting the volume to be collected is provided, which screw is rotatably controlled by a control knob of the pipette, via a control rod connecting this knob to the volume adjustment screw.

When the pipette includes a counter designed to display very accurate volume values, for example a four-digit counter, adjusting the pipette to a given value can sometimes turn out to be delicate. Indeed, the last digit of the counter is generally associated with a drum the rotation of which can be quicker than that of the pipette control knob actuated by the operator, resulting in a difficulty to reach the desired accurate value.

To meet this issue, it can be contemplated to adjoin a system for holding the volume adjustment screw, in different positions of this screw. However, to be able to precisely hold the adjustment screw in as many positions as there are different volume values provided by the counter, it is necessary to design pieces with restrained dimensions, while having extremely complex geometries. This constraint implies a difficult manufacturing process, even beyond feasibility limits of required pieces.

DISCLOSURE OF THE INVENTION

To meet at least partially these drawbacks, one object of the invention is first a ring dogging system for holding the position of a volume adjustment screw for a pipetting system, the ring dogging system being characterised in that it comprises:
- a first toothed wheel comprising first teeth;
- a second toothed wheel comprising second teeth, said first toothed wheel being a lock wheel for being rotatably fixed with respect to a fixed piece of the pipetting system, and the second wheel being rotatably integral with the adjustment screw, or vice versa;
- elastic return means capable of returning the first and second wheels against each other in order to make the first teeth cooperate with the second teeth, said second teeth of the second wheel forming a number N of concentric annular rows, the number N being an integer higher than or equal to 2 and each row being possibly discontinuous, said second wheel having at least one tooth covering zone in which the N annular rows of second teeth respectively have N covering sectors which cover each other along a radial direction of the second wheel, the second teeth of the N covering sectors being angularly offset from each other such that at least one of the first teeth of the first toothed wheel can be in several relative positions with respect to the second wheel, in each of which this first tooth is in contact with one of the second teeth of one of the N sectors, and in contact with one of the second teeth of another of these N sectors.

The invention thus has the feature of using a ring dogging mechanism to hold/lock the volume adjustment screw in different positions. The number of these distinct positions can be extremely large, without actually having to deal with the previously discussed manufacturing problems. Indeed, by providing a second toothed wheel with several concentric annular rows of second teeth, and by performing an angular offset of these teeth within each covering zone, it is possible to hold the adjustment screw in many positions without facing a feasibility problem for these teeth. In other words, the invention turns out to be particularly ingenious in comparison with a solution only providing a single annular row of teeth on the second wheel. Actually, to reach the same number of holding positions than with the invention, this second wheel should thereby have teeth with very small dimensions within the single row, which can turn out to be difficult to manufacture.

The invention preferably has at least one of the following optional characteristics, taken alone or in combination.

Each of the N covering sectors of the second toothed wheel has a same pitch P between its second teeth, and the angular offset between any two covering sectors directly consecutive along the radial direction, among said N sectors, has a value P/N.

The first toothed wheel has a single annular row of first teeth, having the same pitch P between the first teeth.

The integer N is preferentially equal to two, but it could be higher, without departing from the scope of the invention.

Said second wheel has several tooth covering zones, circumferentially spaced from each other, the number of these covering zones being preferentially higher than three.

Each annular row of second teeth has toothed portions circumferentially spaced apart by non-toothed portions, and the covering sectors are formed at the ends of the toothed portions.

Another object of the invention is a pipetting system comprising a volume adjustment screw, as well as a ring dogging system as described above, enabling the volume adjustment screw to hold the position. The system is preferentially a manual collection pipette, but the invention is applicable to any other pipetting system listed above.

Preferably, the second toothed wheel is integral with a ring including a rotatable coupling means through which the volume adjustment screw passes.

The system preferably includes a four-digit counter, the counter comprising:
- a first drum informing about a first digit of the counter;
- a second drum informing about a second digit of the counter;

a third drum informing about a third digit of the counter; and a fourth drum informing about a fourth digit of the counter, the fourth drum being rotatably driven by a gear system rotatably controlled by the volume adjustment screw.

Finally, said lock wheel, rotatably fixed with respect to a fixed piece of the pipetting system, includes radial lugs slidably housed in corresponding longitudinal grooves of this fixed piece.

Further advantages and characteristics of the invention will appear in the non-limiting detailed description below.

BRIEF DESCRIPTION OF THE DRAWING

This description will be made with regard to the appended drawings in which.

DETAILED DESCRIPTION OF PREFERRED EMBODIMENTS

Figure 1:
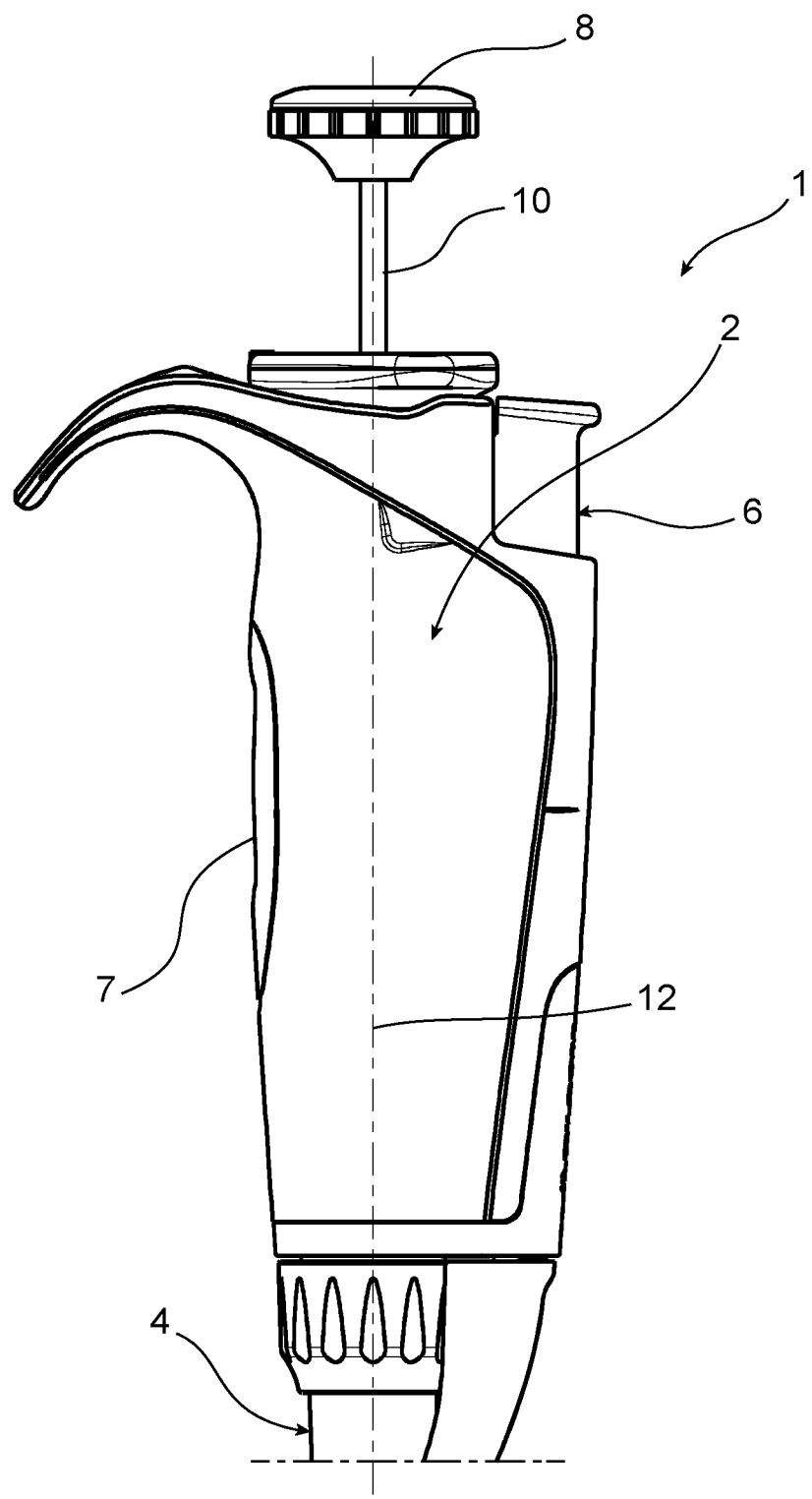
FIG. 1 represents a front view of an air displacement collection pipette, according to the invention.

With reference first to FIG. 1, a manual monochannel collection pipette 1, according to the invention is represented. However, the invention is not limited to such a pipette, but is applicable analogously to multichannel pipettes or to any other manual, motorised or hybrid pipetting system.

The herein manual, air displacement pipette 1, comprises in an upper part, a handle forming body 2, as well as a lower part 4 for integrating at its lower end, a collection cone holder tip (not represented). This tip is provided to hold a cone, also called a consumable and for being ejected from the tip by an ejector system 6, once the pipetting operations are completed.

Figure 2:
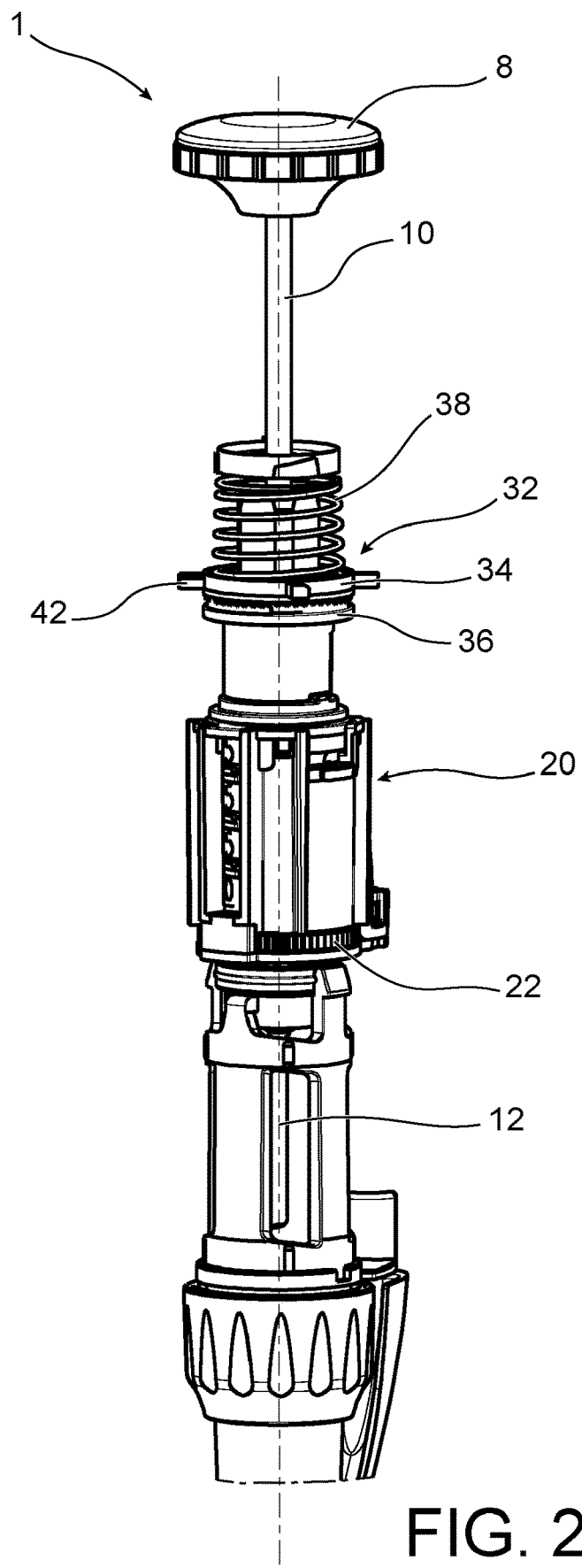
FIG. 2 represents a perspective view of part of the pipette shown in the previous figure, comprising a system for holding the position of the volume adjustment screw, according to a preferred embodiment of the invention.
Figure 3:
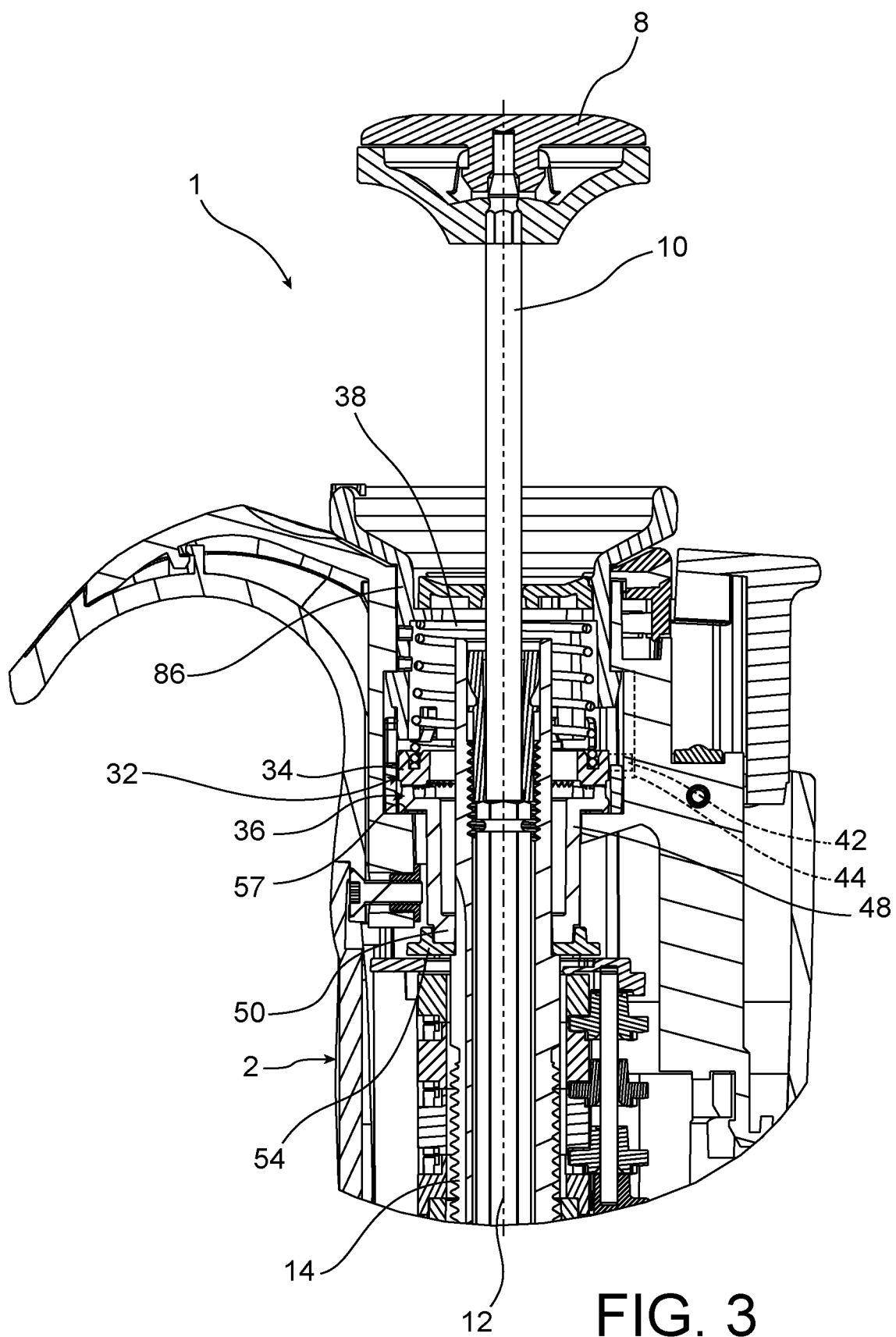
FIG. 3 represents a cross-section view of an upper part of the pipette shown in the previous figure.

As is visible in FIGS. 1 to 3, the pipette 1 includes a control knob 8 for being actuated by an operator's thumb, in order to perform different pipetting operations such as collecting the liquid, and dispensing the same. The knob 8 is mounted to the top end of a control rod 10 for being translationally displaced during the abovementioned pipetting steps, along a longitudinal central axis 12 of the pipette. The knob 8 is rotatably coupled to the rod 10, and the latter has a lower end cooperating with a volume adjustment screw 14. This cooperation is made such that a rotation of the control rod 10 causes a rotation of the screw 14 about its own axis, being preferably the same as the longitudinal central axis 12 of the pipette.

In a known manner, the rotation of the adjustment screw 14 causes its translation along the axis 12, or the translation of another piece, in order to axially displace a piston housed in a suction chamber of the lower part 4 of the pipette. It is the adjustment of the top position of this piston which makes it possible to influence the volume subsequently collected upon pipetting.

Figure 4:
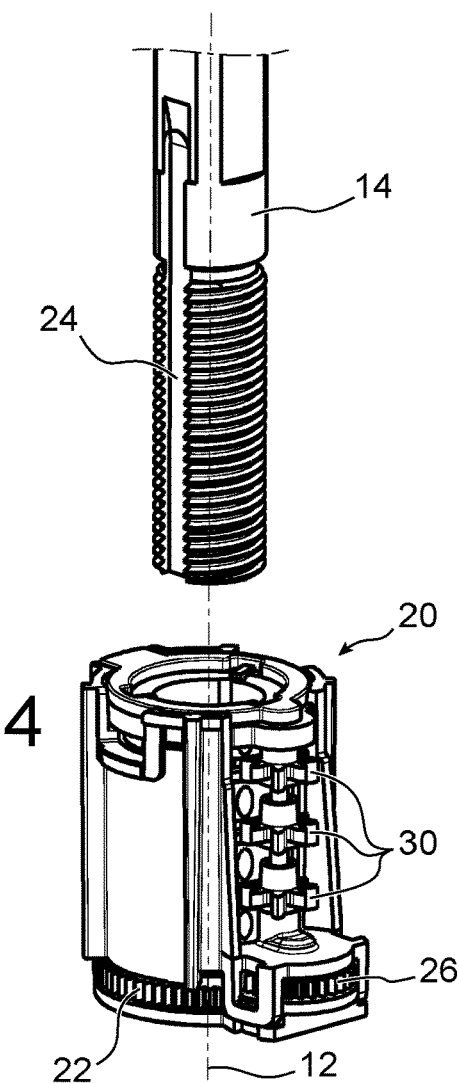
FIG. 4 represents a perspective view of a counter equipping the pipette shown in the previous figures.

FIGS. 2 and 4 show that the volume adjustment screw 14 rotatably drives a counter 20, which is to display the volume value adjusted through a window 7 (referenced in FIG. 1) of the handle 2. This counter 20 is here a four-digit counter. This counter type provides a very high accuracy in comparison with counters comprising fewer digits, for example with respect to a counter having only three digits.

Figure 5:
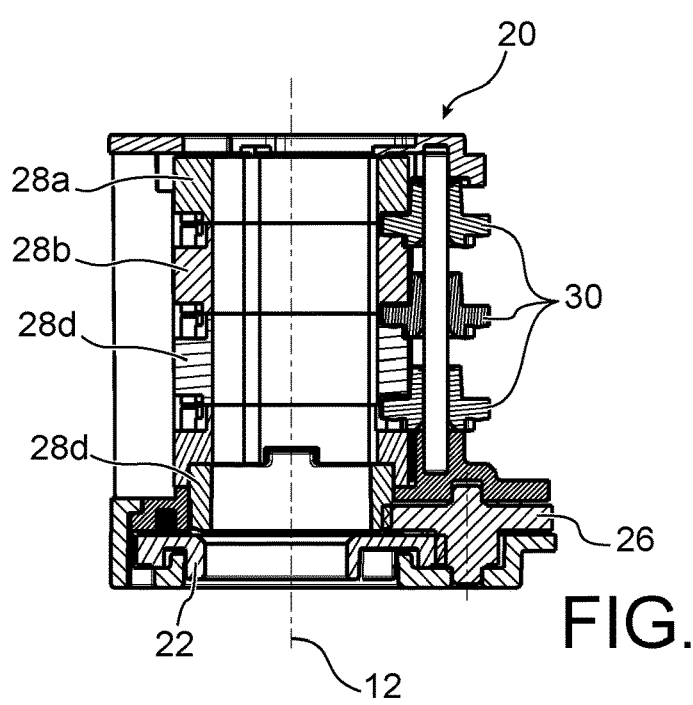
FIG. 5 represents a longitudinal cross-section view of the counter shown in the previous figure.

The counter 20 first comprises a gear system equipped with an externally-toothed wheel 22 centred on the axis 12, directly rotatably driven by the adjustment screw 14. This driving is made for example via a lug inwardly projecting from the wheel 22, and housed in a longitudinal groove 24 of the screw 14. This wheel 22 meshes with another off-centred, externally-toothed wheel 26, which itself meshes with teeth provided on a fourth drum 28d of the counter, informing about the fourth digit of adjusted volume. The fourth drum 28d, visible in FIG. 5, rotates at a high speed with respect to the control knob, for example at a speed five times higher.

The counter also includes a first drum 28a, a second drum 28b, as well as a third drum 28c respectively informing about the first, second, and third digits of the adjusted volume. These drums 28a-28d are superimposed with each other along axis 12, and drive each other in a known manner, via movement transmission members 30.

The accuracy of such a counter 20 is associated with the implementation of a system specific to the invention, enabling the adjustment screw 14 to be held/locked, once the same has been brought to the accurate position leading to the desired volume value. This system 32, of the ring dogging nature, also enables the screw 14 to be readily displaced between different positions, during its rotation performed to change the set point of volume to collect. The system 32 turns out to be particularly advantageous in that it helps the operator to accurately adjust the last digit of the volume to the desired value, in spite of the high rotation speed of the fourth drum observed during the rotation of the control knob of the pipette. Hence, the volume adjustment ergonomy is largely improved.

Figure 6:
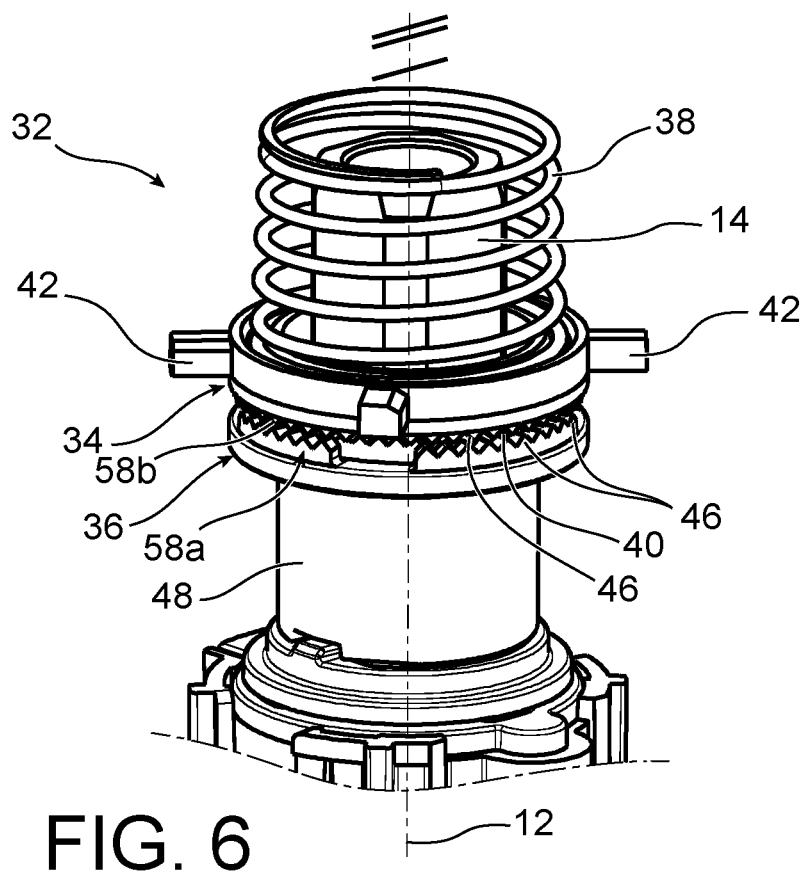
FIG. 6 represents a detailed perspective view of the holding ring dogging system shown in FIG. 2.

The position holding system 32, visible in FIGS. 2, 3 and 6, comprises overall a first toothed wheel 34 cooperating with a second toothed wheel 36, and a compression spring 38 returning against each other both coaxial wheels 34, 36 centred on the axis 12.

The first wheel 34, the one located higher on the pipette, includes first teeth 40 which extend axially downwardly. This wheel 34 is rotatably fixed with respect to the handle 2, via radial lugs 42 circumferentially spaced and projecting outwardly from the wheel. Each lug 42 is slidably housed in a longitudinal groove 44 of the internal surface of the handle 2, as is depicted for one of them in FIG. 3. The first wheel 34 thus remains rotatably fixed in the handle 2, but translationally movable inside the same, along the axis 12.

Under the first wheel 34, also called a lock wheel, the second wheel 36 includes second teeth 46 which extend axially upwardly. This second wheel 36 is carried by a ring 48, or a shank, the bottom end of which comprises a rotatable coupling means 50 through which the adjustment screw 14 passes. The means 50 ensures rotatable coupling with the screw 14 by form fitting, for example by the presence of a flat or a similar element. The wheel 36 thus remains rotatably driven by the adjustment screw 14, and remains translationally fixed. The latter feature is achieved by abutting the ring 48 on a bottom stop 54 secured inside the handle 2, and/or by abutting the wheel 36 on an internal shoulder 57 of this handle.

The spring 38 applies in turn a pressure onto the upper part of the first wheel 34, via a spring bottom end housed in an upper throat of this wheel. The axial force developed by the spring 38 thus causes the first wheel 34 to be displaced downwardly and to be pressed against the second wheel 36 which remains translationally fixed, resulting in a cooperation between the first and second teeth 40, 46.

Figure 7:
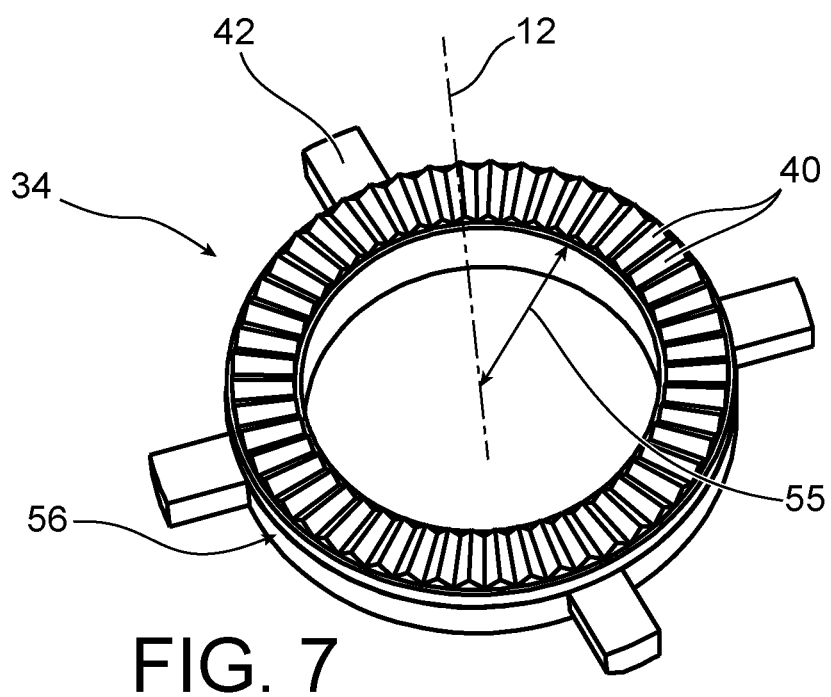
FIG. 7 represents a perspective view of a first toothed wheel equipping the holding ring dogging system shown in the previous figure.

The disposition of these teeth is specific to the invention, and will be described with reference to FIGS. 7 to 9.

First as regards the first wheel 34, its first axial teeth 40 are arranged within a single annular row 56, which is centred on the axis 12 and preferably continues over 360°. The number of teeth 40 can for example be in the order of fifty, with a regular pitch P provided between the same teeth 40.

The second wheel 36 includes in turn two annular rows, or a higher number of rows. However, in the preferred embodiment which is described, this number is set to two concentric annular rows 58a, 58b, centred on the axis 12.

The first row 58a, corresponding to the external row, is discontinuous. This implies that it is formed by toothed portions 60a each corresponding to an arc of circle provided with teeth 46. These toothed portions 60a are circumferentially preferably regularly spaced from each other. Between them, non-toothed portions 62a, corresponding to recessed portions are provided. By way of example, the first annular row 58a includes four toothed portions 60a of about ten teeth each, as well as four non-toothed portions 62a having substantially the same angular extent as the toothed portions 60a.

Analogously, the second row 58b, corresponding to the internal row, is discontinuous. This implies that it is formed by toothed portions 60b each corresponding to an arc of circle provided with teeth 46. These toothed portions 60b are circumferentially preferably regularly spaced from each other. Between them, non-toothed portions 62b, corresponding to recessed portions, are provided. By way of example, the second annular row 58b includes four toothed portions 60b of about ten teeth each, as well as four non-toothed portions 62b having substantially the same angular extent as the toothed portions 60b.

Figure 8:
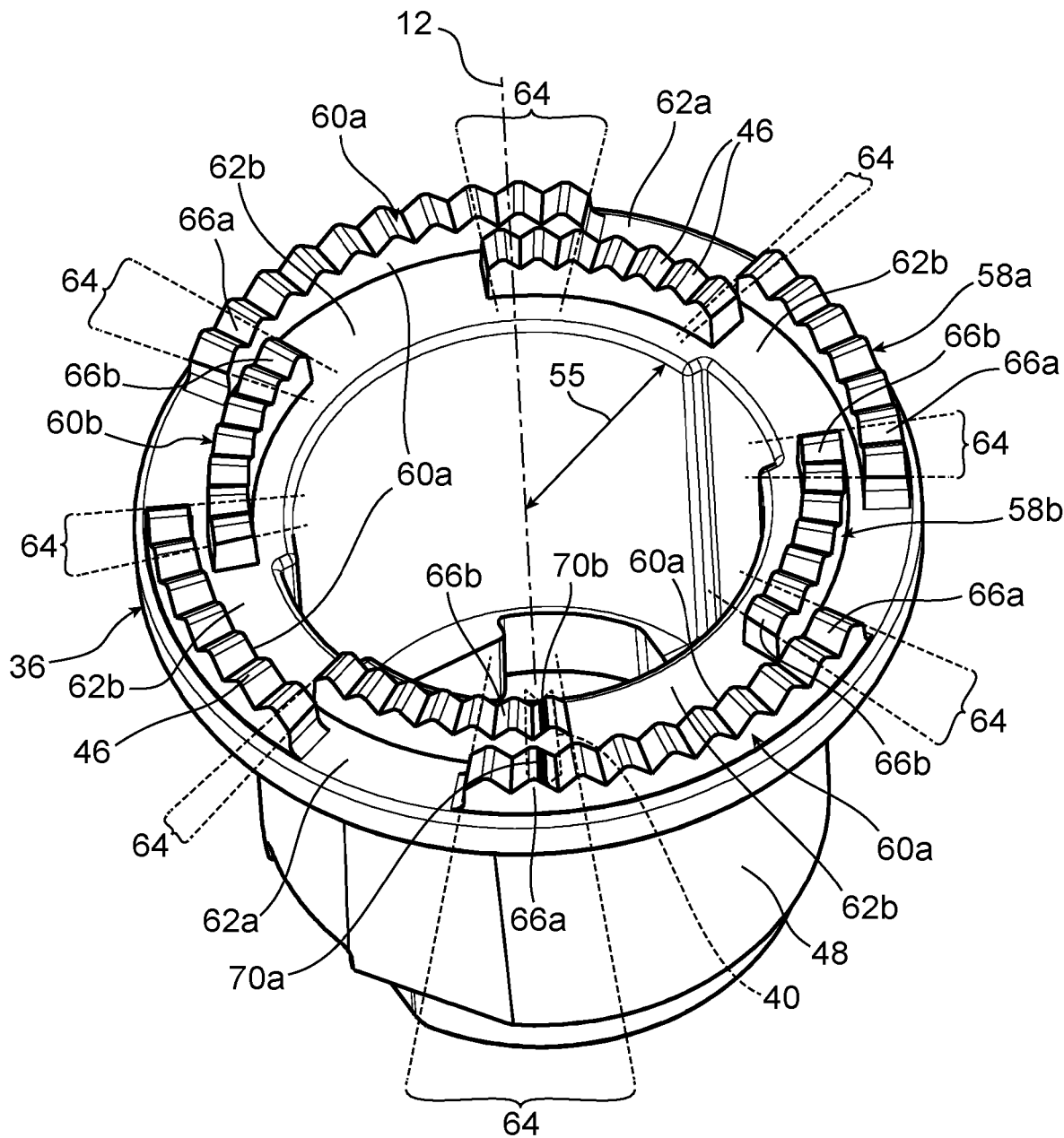
FIG. 8 represents a perspective view of a second toothed wheel equipping the holding ring dogging system shown in FIG. 6.
Figure 9:
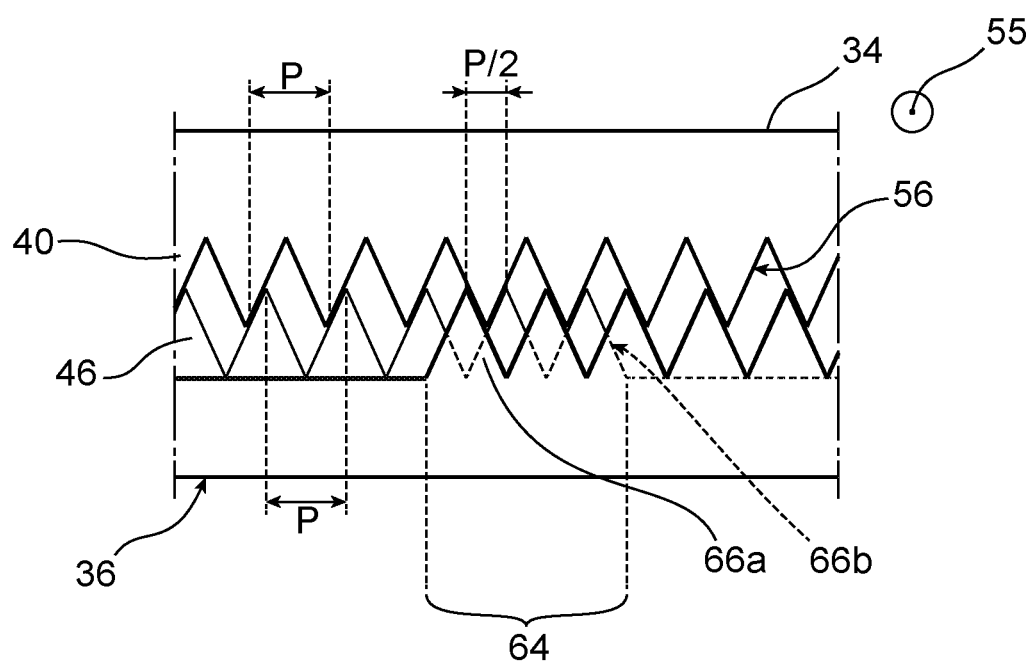
FIG. 9 is a side schematic view showing the cooperation between both toothed wheels shown in FIGS. 7 and 8.

As is visible in FIG. 8, the toothed portions 60a, 60b are arranged in phase offset, such that each toothed portion 60a is essentially radially facing a non-toothed portion 62b of the second row 58b, as well as each toothed portion 60b is essentially radially facing a non-toothed portion 62a of the first row 58a.

The pitch between the teeth 46 of each toothed portion 60a, 60b is the same pitch P as for the teeth 40 of the first wheel 34.

At the ends of these toothed portions 60a, 60b which partially cover each other along the radial direction 55, tooth covering zones are formed, these zones being referenced 64 in FIG. 8.

Each covering zone 64 is formed by a covering sector 66a corresponding to one end of one of the toothed portions 60a, as well as by a covering sector 66b corresponding to one end of one of the toothed portions 60b. Both sectors 66a, 66b are thus radially facing each other, to form one of the eight covering zones 64 provided here, regularly spaced from each other. The number of teeth per sector 66a, 66b is for example between two and five.

Within each covering zone 64, the teeth 46 of the sector 66a are offset by a half pitch P/2 with respect to the teeth 46 of the sector 66b. Consequently, each first tooth 40 which is in cooperation with one of the covering zones 64 of the second wheel 36, is in contact, on the one hand, with one of the teeth 46 of the sector 66a of this zone, and in contact, on the other hand, with one of the teeth 46 of the sector 66b of this same covering zone 64. This feature has been represented in FIG. 9, as well as at the bottom of FIG. 8 schematically showing a first tooth 40 in contact with two directly consecutive teeth 46 along the circumferential direction, and respectively belonging to both sectors 66a, 66b.

To do this, the radial length of each first tooth 40 is for example substantially twice higher than the radial length of each second tooth 46, which enables two contact surfaces 70a, 70b to be set between a first tooth 40, and both directly consecutive teeth 46 within the covering zone 64. In this regard, it is noted that these surfaces 70a, 70b, visible in the bottom of FIG. 8, are arranged on the upper part of the teeth 46. The reason for that is the phase offset provided between the teeth 46 of both sectors 66a, 66b, which results in the first teeth 40 not fully penetrating the troughs formed between the second teeth 46.

In operation, when the operator adjusts the desired volume via the control knob 8, he/she drives the screw 14 which in turn causes simultaneous rotation of the second wheel 36. The volume adjustment between its lower and upper limits usually requires several revolutions of the control knob. During the rotation movement of the second wheel 36, the second moving teeth 46 exert a force onto the first teeth 40 which tends to push back the first wheel 34 axially upwardly, before the same is again forced to return downwardly under the antagonistic effect of the spring 38. This axial reciprocating movement of the first lock wheel 34 is observed when switching from a tooth to another, and it enables the system 32 to index the screw 14 in a very high number of positions. This facilitates making an accurate adjustment of the desired volume. In particular, within each covering zone 64, the number of possible positions for a same first tooth 40 relative to the wheel 46, substantially corresponds to twice the number of second teeth 46 in each covering sector 66a, 66b forming this zone 64. By way of indicating purposes, it is noted that during a 360° rotation of the adjustment screw 14, it can be indexed in about ten different angular positions, with each of these positions being stable and accurate, because of an always different cooperation between the first and second teeth 40, 46.

The accuracy in the volume adjustment is advantageously increased, without affecting ease of manufacture of the toothed wheels 34, 36. This can for example be readily made by plastic injection, while preserving a satisfactory tooth quality.

Of course, various modifications can be provided by those skilled in the art to the invention just described, only by way of non-limiting examples, and the scope of which is defined by the appended claims. For example, modifications could be brought to place the multiple annular rows on the first wheel, and not on the second toothed wheel, which would thereby have only one annular row of teeth.

What is claimed is:

1. A ring dogging system (32) for holding the position of a volume adjustment screw (14) for a pipetting system (1), the ring dogging system (32) comprising:

a first toothed wheel (34) comprising first teeth (40);

a second toothed wheel (36) comprising second teeth (46), said first toothed wheel (34) being a lock wheel for being rotatably fixed with respect to a fixed piece (2) of the pipetting system, and the second wheel (36) being rotatably integral with the adjustment screw (14), or vice versa;

elastic return means (38) capable of returning the first and second wheels (34, 36) against each other in order to make the first teeth (40) cooperate with the second teeth (46), said second teeth (46) of the second wheel (36) forming a number N of concentric annular rows (58*a*, 58*b*), the number N being an integer higher than or equal to 2 and each row being possibly discontinuous, said second wheel (36) having at least one tooth covering zone (64) in which the N annular rows (58*a*, 58*b*) of second teeth respectively have N covering sectors (66*a*, 66*b*) which cover each other along a radial direction (55) of the second wheel, the second teeth (46) of the N covering sectors being angularly offset from each other such that at least one of the first teeth (40) of the first toothed wheel (34) can be in several relative positions with respect to the second wheel (36), in each of which this first tooth (40) is in contact with one of the second teeth (46) of one of the N sectors (66*a*), and in contact with one of the second teeth (46) of another of these N sectors (66*b*).

2. The system according to claim 1, wherein each of the N covering sectors (66*a*, 66*b*) of the second toothed wheel (36) has a same pitch P between its second teeth (46), and in that the angular offset between any two covering sectors (66*a*, 66*b*) directly consecutive along the radial direction (55), among said N sectors, has a value P/N.

3. The system according to claim 2, wherein the first toothed wheel (34) has a single annular row (56) of first teeth (40), having the same pitch P between the first teeth.

4. The system according to claims 1, wherein-the integer N is equal to two.

5. The system according to claims 1, wherein said second wheel (36) has several tooth covering zones (64), circumferentially spaced from each other, and in that the number of these covering zones (64) is preferentially higher than three.

6. The system according to claims 1, wherein each annular row of second teeth (58*a*, 58*b*) has toothed portions (60*a*, 60*b*) circumferentially spaced apart by non-toothed portions (62*a*, 62*b*), and in that the covering sectors (64) are formed at the ends of the toothed portions (60*a*, 60*b*).

7. A pipetting system (1) comprising a volume adjustment screw (14), as well as a ring dogging system (32) according to claim 1 for holding the position of the volume adjustment screw.

8. The pipetting system according to claim 7, wherein the second toothed wheel (36) is integral with a ring (48) including a rotatable coupling means (50) through which the volume adjustment screw (14) passes.

9. The pipetting system according to claim 7, further comprising a four-digit counter (20), the counter comprising:
- a first drum (28*a*) informing about a first digit of the counter;
- a second drum (28*b*) informing about a second digit of the counter;
- a third drum (28*c*) informing about a third digit of the counter; and
- a fourth drum (28*d*) informing about a fourth digit of the counter, the fourth drum being rotatably driven by a gear system (22, 26) rotatably controlled by the volume adjustment screw (14).

10. The pipetting system according to claim 7 wherein said lock wheel (34), rotatably fixed with respect to a fixed piece (2) of the pipetting system, includes radial lugs (42) slidably housed in corresponding longitudinal grooves (44) of this fixed piece (2).

* * * * *